US012403958B2

(12) United States Patent
Sperrle et al.

(10) Patent No.: US 12,403,958 B2
(45) Date of Patent: Sep. 2, 2025

(54) METHOD FOR DISPLAYING AN ENVIRONMENT OF A VEHICLE HAVING A COUPLED TRAILER, COMPUTER PROGRAM, COMPUTING DEVICE AND VEHICLE

(71) Applicant: Robert Bosch GmbH, Stuttgart (DE)

(72) Inventors: Christian Sperrle, Ann Arbor, MI (US); Elizabeth Kao, Northville, MI (US); James Stephen Miller, Dexter, MI (US); Matthias Mayerle, Stuttgart (DE); Raphael Cano, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 200 days.

(21) Appl. No.: 18/301,458

(22) Filed: Apr. 17, 2023

(65) Prior Publication Data
US 2023/0406410 A1    Dec. 21, 2023

(30) Foreign Application Priority Data

Jun. 20, 2022    (DE) ...................... 10 2022 206 127.6

(51) Int. Cl.
B62D 15/02    (2006.01)
B62D 13/00    (2006.01)
(Continued)

(52) U.S. Cl.
CPC ......... B62D 15/029 (2013.01); B62D 13/005 (2013.01); G06T 11/00 (2013.01); H04N 5/91 (2013.01); H04N 7/181 (2013.01)

(58) Field of Classification Search
CPC .... B62D 15/029; B62D 13/005; B62D 13/06; G06T 11/00; H04N 5/91; H04N 7/181;
(Continued)

(56) References Cited

U.S. PATENT DOCUMENTS 8,223,204 B2 *    7/2012  Hahn ................. B62D 15/0275
                                                   348/148
9,566,911 B2 *    2/2017  Greenwood ........... H04N 23/54
(Continued)

FOREIGN PATENT DOCUMENTS

DE    102015214611 A1    2/2017
DE    102014223141 B4    6/2019
(Continued)

OTHER PUBLICATIONS

Machine Translation of DE102019133948A1 PDF File Name: "DE102019133948A1_Machine_Translation.pdf" (Year: 2021).*

Primary Examiner — Lindsay M Low
Assistant Examiner — Ruben Picon-Feliciano
(74) Attorney, Agent, or Firm — NORTON ROSE FULBRIGHT US LLP

(57) ABSTRACT

A method for displaying an environment of a vehicle having a coupled trailer. The method includes: recording a sequence of vehicle camera images using at least three vehicle cameras; recording a sequence of trailer camera images using the trailer camera; acquiring odometry data of the vehicle; ascertaining the trailer angle; storing items of image information about the close range of the vehicle; adjusting the position of the stored items of image information as a function of the detected odometry data; and displaying an environment model from a virtual observational perspective, preprocessed current vehicle and trailer camera images being projected onto a projection area of the environment model and being joined. For partial areas of the environment of the vehicle that are not represented, the stored items of information are projected onto the projection area according to their position and are joined to the vehicle and trailer camera images.

12 Claims, 2 Drawing Sheets

(51) Int. Cl.
*G06T 11/00* (2006.01)
*H04N 5/91* (2006.01)
*H04N 7/18* (2006.01)

(58) Field of Classification Search
CPC ............... B60R 1/22; B60R 2300/304; B60R 2300/607; B60R 1/25; B60R 1/26; B60R 2300/105; B60R 2300/303; B60R 2300/802
See application file for complete search history.

(56) References Cited

U.S. PATENT DOCUMENTS

| | | | |
|---|---|---|---|
| 11,554,718 B2* | 1/2023 | Kuruba | B60R 1/26 |
| 2022/0343535 A1* | 10/2022 | Ip | G06T 7/73 |
| 2023/0064558 A1* | 3/2023 | Griffin | B60K 35/28 |

FOREIGN PATENT DOCUMENTS

| | | | |
|---|---|---|---|
| DE | 102019133948 A1 * | 6/2021 | |
| WO | 2018149625 A1 | 8/2018 | |
| WO | 2021041877 A1 | 3/2021 | |

\* cited by examiner

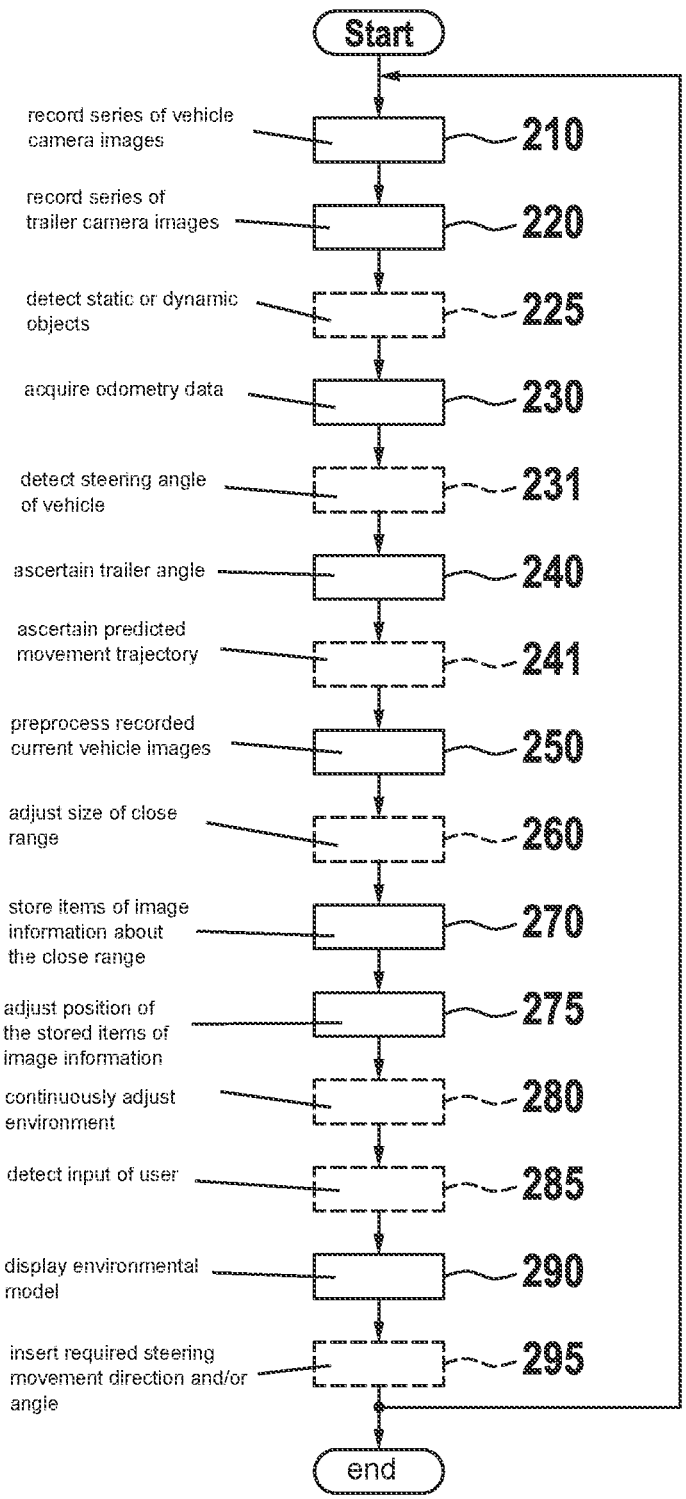

METHOD FOR DISPLAYING AN ENVIRONMENT OF A VEHICLE HAVING A COUPLED TRAILER, COMPUTER PROGRAM, COMPUTING DEVICE AND VEHICLE

CROSS REFERENCE

The present application claims the benefit under 35 U.S.C. § 119 of German Patent Application No. DE 10 2022 206 127.6 filed on Jun. 20, 2022, which is expressly incorporated herein by reference in its entirety.

FIELD

The present invention relates to a method for displaying an environment of a vehicle having a coupled trailer. The present invention also relates to a computer program, comprising commands, which, when the program is executed by a computer, prompt the computer to carry out the steps of the method according to the present invention. The present invention furthermore relates to a computing device for a vehicle, which is configured in such a way that it carries out the steps of the method according to the present invention. The present invention also relates to the vehicle having this computing device.

BACKGROUND INFORMATION

PCT Patent Application No. WO 2021/041877 A1 describes a method for displaying an environment of a vehicle having a coupled trailer. An image of the rear-facing camera situated on the vehicle is complemented in areas of the display of the trailer with recorded images of other cameras.

PCT Patent Application No. WO 2018/149625 A1 describes a display method, wherein images of the environment of a vehicle are recorded and portions of these images are stored. Subsequently, a composite overall image is generated on the basis of current images and the stored images.

German Patent No. DE 10 2014 223 141 B4 describes ascertaining trailer angle between a longitudinal axis of a drawbar of a trailer and a longitudinal axis of a vehicle, on which the coupling head of the vehicle is situated.

An objective of the present invention is to improve a display of the environment of a vehicle having a coupled trailer.

SUMMARY

The above objective may be achieved in accordance with features of the present invention.

The present invention relates to a method for displaying an environment of a vehicle having a coupled trailer, the vehicle comprising at least three vehicle cameras, which are respectively situated on different sides of the vehicle. Advantageously, the vehicle cameras thus have different detection perspectives and detection ranges of the environment. In other words, each vehicle camera detects a partial area of the environment of the vehicle, in particular on the respective side of the vehicle. The at least three vehicle cameras advantageously each comprise a wide-angle optics so that the detection ranges of two adjacent vehicle cameras in particular overlap. The trailer has at least one trailer camera situated on the rear side of the trailer. The trailer camera comprises in particular a wide-angle optics and is preferably oriented with a detection range rearward into the environment. The detection range of the trailer camera advantageously overlaps at least with the detection ranges of the vehicle cameras situated on the right side and on the left side of the vehicle. The overlapping areas of the detection range of the trailer camera are a function of the current trailer angle of the trailer on the vehicle.

According to an example embodiment of the present invention, first, a series of vehicle camera images is recorded using each of the at least three vehicle cameras. The vehicle camera images in each case represent a partial area of the environment, which corresponds in particular to the respective detection range. Furthermore, a series of trailer camera images is recorded using the trailer camera. The trailer camera images represent the environment of the vehicle behind the trailer. In a further step, odometry data of the vehicle are acquired, for example a speed of the vehicle and a yaw angle about the vertical axis of the vehicle. In another method step, a trailer angle between the longitudinal axis of the trailer and the longitudinal axis of the vehicle, on which advantageously the coupling head of the vehicle is situated, is ascertained. Furthermore, in one method step, the recorded current vehicle camera images and the recorded current trailer camera image are preprocessed. The preprocessing advantageously comprises a rectification of the vehicle camera images recorded in distorted fashion by a wide-angle optics and/or of the trailer camera image recorded in distorted fashion by a wide-angle optics. The preprocessing may additionally or alternatively comprise an adjustment of the brightness, the contrast and/or the resolution. The preprocessing may additionally or alternatively comprise respectively a coordinate transformation for changing the perspective on the representation of the vehicle camera images and/or of the trailer camera image. Subsequently, items of image information about the close range of the vehicle are stored as a function of the preprocessed vehicle camera images and/or of the preprocessed trailer camera image, a position relative to the vehicle being assigned to the stored items of image information. The close range of the vehicle is preferably an area around the vehicle at a distance of less than or equal to 10 meters, in particular at a distance of less than or equal to 5 meters, preferably at a distance of less than or equal to 3 meters, particularly preferably at a distance of less than or equal to 2 meters, further preferably an area at a distance of less than or equal to 1 meter. The position of the stored items of image information is subsequently adjusted as a function of the acquired odometry data of the vehicle. In other words, the position of the stored items of image information relative to the vehicle is shifted based on the detected movement of the vehicle. For this purpose, a stored area of image information regarding the environment of the vehicle is advantageously created, which is greater than the close range of the vehicle. Subsequently, a model of the environment is displayed from a virtual observational perspective, the trailer being displayed at least semi-transparently as a function of the ascertained trailer angle. The virtual observational perspective is advantageously a top-down perspective or a perspective vertically from above downward. Alternatively, the observational perspective may be for example a perspective obliquely downward from above. The displayed observational perspective represents in particular the surrounding area behind the vehicle, comprising the surrounding area including and around the trailer. When displaying the environment model, the preprocessed current vehicle camera images and the preprocessed current trailer camera image are projected onto a projection area of the environment model and joined together. In the display, the stored items of image information regarding the areas of the environment not represented in the current vehicle camera images or the current trailer camera image are also loaded according to their position relative to the vehicle and projected onto the projection area. The loaded and projected items of image information are joined together with the other projected images, that is, with the projected vehicle camera images and the projected trailer camera image, joint lines being ascertained in particular in the process. The method results in the advantage that when the vehicle is traveling with the trailer, a large and complete overall view is created for the driver of the vehicle with images currently or just previously recorded. Artifacts in the display of the environment model are avoided. Advantageously, by way of the method, the driver of the vehicle obtains information that makes it readily possible to understand the behavior of the trailer and imminent dangers in reverse travel with the trailer or when parking the trailer since surrounding areas laterally next to the trailer and surrounding areas below the trailer can be represented completely in the displayed environment model. The lateral surrounding area may be particularly critical in reverse travel with the trailer, since it may comprise potential collision objects. The surrounding area below the trailer may be particularly critical when parking the trailer, since potholes, rocks or other obstacles in this surrounding area imperil a stable parking of the trailer, in particular if these are located in the area of the wheels of the trailer.

In one advantageous development of the present invention, a first masking for the projection of the stored image information regarding the currently not detected partial surrounding areas and/or a second masking for the projection of the trailer camera image on the projection surface regarding the currently detected partial surrounding area of the trailer camera are continuously adjusted based on the ascertained trailer angle. For this purpose, the first and/or second masks are loaded in particular from a memory based on the ascertained trailer angle. In other words, the joint lines between the stored items of image information and the projected vehicle camera images and/or the trailer camera image in the environment model are adjusted or shifted in their position and size based on the ascertained trailer angle. This yields the advantage that the environment model can be ascertained and displayed quickly.

In one example embodiment of the present invention, the steering angle of the vehicle is additionally acquired. Subsequently, a predicted movement trajectory of the trailer is ascertained at least as a function of the ascertained trailer angle and as a function of the acquired steering angle. Optionally, the predicted movement trajectory may be ascertained as a function of further variables, for example as a function of the acquired yaw angle of the vehicle and/or as a function of the speed of the vehicle and/or as a function of data of the trailer, for example the distance from the coupling point at the drawbar to the wheel axle of the trailer, in particular along the longitudinal axis of the trailer. In this embodiment, the ascertained predicted movement trajectory of the trailer is additionally shown in the displayed environment model. This results in the advantage for the driver of the vehicle that he is readily able to apprehend how the trailer behaves or moves in reverse travel. Reverse travel with the trailer is simplified considerably in this embodiment.

In a further development of the present invention, a detection of a static or dynamic object is provided as a function of the detected vehicle camera images and/or of the detected trailer camera image and/or of another distance detection device. The detected object is in particular located on the ground and thus preferably has a low height. Preferably, the detected object is subsequently highlighted in the displayed environment model, in particular by a border and/or an adjustment of the brightness or a color adjustment. The highlighting advantageously occurs if the detected static object is located in the ascertained predicted movement trajectory of the trailer or if the detected dynamic object is moving into the ascertained predicted movement trajectory. Alternatively or additionally, it may be provided that a collision warning be displayed for a user of the vehicle if the detected object is located in the ascertained predicted movement trajectory of the trailer and/or if the detected dynamic object is moving into the ascertained predicted movement trajectory of the trailer.

According to an example embodiment of the present invention, alternatively or additionally, it may be provided that distance information between the detected object and the trailer or one of the wheels of the trailer is displayed when moving along the ascertained predicted movement trajectory of the trailer, the distance information advantageously being shown within the displayed environment model.

In another example embodiment of the present invention, an input of a user regarding a parking space for the trailer is acquired and/or an (automatic) detection of the parking space for the trailer is performed on the basis of the detected vehicle camera images and/or the detected trailer camera image. Preferably, the parking space is displayed within the environment model as an insertion, for example schematically as a border and/or surface of the detected or ascertained parking space. Subsequently, a brightness and/or coloring of the displayed movement trajectory of the trailer and/or of the insertion representing the parking space in the displayed environment model is adjusted when the movement trajectory guides the trailer to the input or detected parking space. Alternatively or additionally, the required steering movement direction and/or the required steering angle for the automatic or assisted guidance of the trailer to the input or detected parking space is set or displayed, a counter-torque being advantageously produced by a steering motor in the event of a motion counter to the required steering motion direction, so that in particular an incorrect steering on the part of the driver may be rendered difficult or avoided. This embodiment of the present invention facilitates driving the vehicle for parking the trailer.

The display of the environment model preferably occurs from a virtual observational perspective vertically from top to bottom. In this embodiment, the driver or user advantageously obtains a great overview over the surrounding area behind the vehicle and over the surrounding area laterally beside and behind the trailer.

In a preferred embodiment of the present invention, the environment model is displayed from a virtual observational perspective, which is within and/or above the trailer and is oriented essentially in the rearward environment of the trailer, in particular, when an ascertained distance between the trailer and the detected or ascertained parking space falls below a specified distance threshold value. In other words, a change to this virtual observational perspective preferably occurs as soon as the ascertained distance between the trailer and the parking space falls below the specified distance threshold value.

Shortly before reaching the parking space, the driver of the vehicle is thereby shown a particularly clear representation for the precise positioning of the trailer.

In a particularly preferred embodiment of the present invention, the display of the environment model comprises at least an insertion of a schematic border of the trailer, which represents the dimensions of the trailer, the schematic border representing the trailer being automatically ascertained on the basis of the at least three vehicle camera images. For this purpose, the trailer is preferably displayed in at least semi-transparent fashion, and particularly preferably the trailer is displayed in transparent fashion. The schematic border may be represented two-dimensionally or three-dimensionally. This embodiment makes it particularly easy for the driver to comprehend the display and increases the clarity considerably.

There may be a further provision for the size of the close range to be adjusted as a function of the ascertained dimensions of the trailer or as a function of the detected user input regarding the dimensions of the trailer and/or as a function of the detected odometry data and/or as a function of the ascertained trailer angle and/or as a function of the ascertained predicted movement trajectory of the trailer. A reduced size of the close range makes it possible to save computing power and thus reduce the power consumption of the computing device as well as the storage occupancy in an electronic memory for storing the items of image information about the close range of the vehicle.

The present invention also relates to a computer program, comprising commands, which, when the program is executed by a computer, prompt the computer to carry out the steps of the method according to the present invention.

The present invention furthermore relates to a computing device for a vehicle, in particular a central processing unit or a zonal processing unit or a control unit. The computing device comprises at least one first signal input, which is designed to provide a first signal, which represents recorded vehicle camera images of a vehicle camera. The computing device furthermore comprises at least one second signal input, which is designed to provide a second signal, which represents recorded trailer camera images of a trailer camera. Moreover, the computing device, in particular a processor of the computing device, is configured so that it performs the steps of the method according to the present invention, an output signal being produced in the process for a display device for displaying an environment model.

The present invention also relates to a vehicle comprising the computing device.

Further advantages are yielded by the subsequent description of exemplary embodiments with reference to the figures.

BRIEF DESCRIPTION OF THE DRAWINGS

FIG. 2 shows a method sequence as a block diagram, according to an example embodiment of the present invention.

DETAILED DESCRIPTION OF EXAMPLE EMBODIMENTS

Figure 1A:
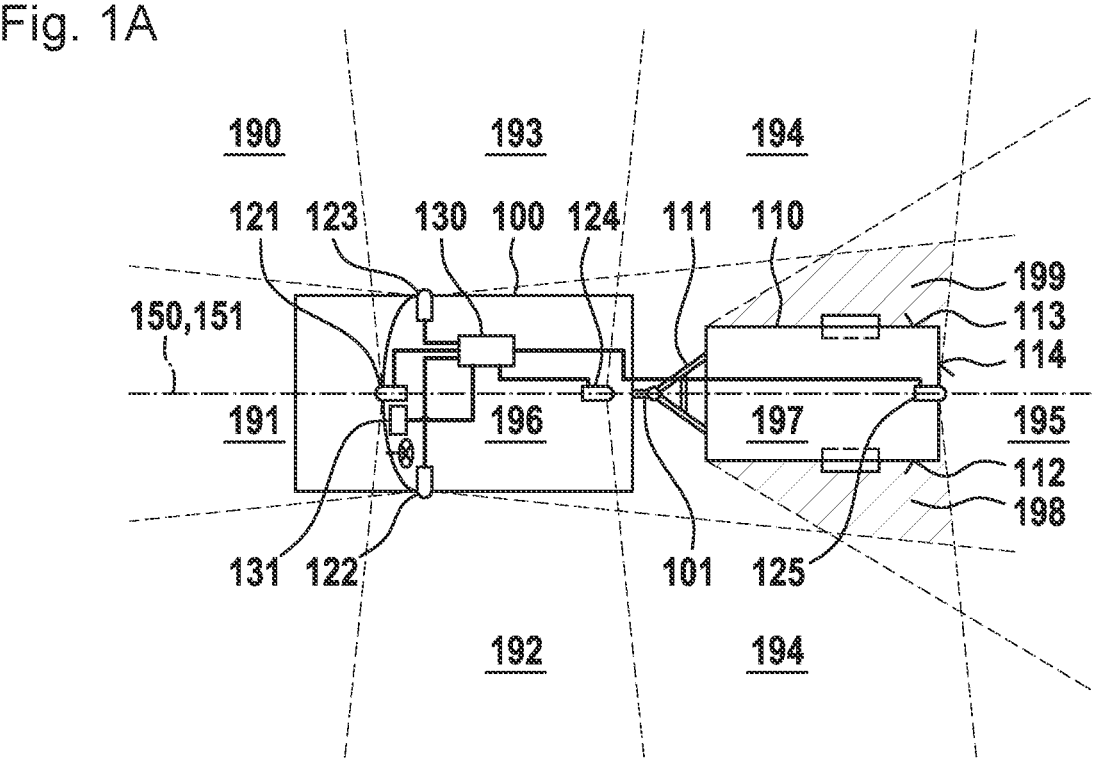
FIG. 1A shows a vehicle with trailer, according to an example embodiment of the present invention.

FIG. 1A shows a vehicle 100 with trailer 110 schematically from above in a top view. The vehicle 100 and the trailer 110 are connected to each other by a hitch 101 of the vehicle 100 and by the drawbar 111 of the trailer 110. Between the longitudinal axis 150 of vehicle 100 and the longitudinal axis 151 of the trailer, there is a trailer angle α, which in FIG. 1A is 0° when the two longitudinal axes 150, 151 are identically oriented. In this example, vehicle 100 comprises four vehicle cameras 121, 122, 123, 124 of a camera system 120 of vehicle 100. Each of the four vehicle cameras 121, 122, 123 and 124 respectively records a series of vehicle camera images of a respective partial area 191, 192, 193 or 194 of the environment 190 of vehicle 100. Trailer 110 additionally comprises a trailer camera 125 on the rear side 114 of trailer 110, which records a trailer camera image of a rearward surrounding area 195 of vehicle 100 or of trailer 110. The four vehicle cameras 121, 122, 123, 124 and the trailer camera 125 are connected to the computing device 130 of vehicle 100. The computing device is advantageously designed to produce a virtual model of the environment, the current vehicle camera images of the vehicle cameras 121, 122, 123, 124 and the current trailer camera image of the trailer camera 125 being projected into the environment model, the environment model in particular being textured by these camera images. The environment model is preferably displayed on a display device 131 of vehicle 100, in particular as a surround view or a panoramic image representation of the rearward environment. The partial surrounding area 199 on the right side 113 of trailer 110 and the partial surrounding area 198 on the left side 112 of trailer 110, however, are not visible for any camera or are not recorded by any camera, since the trailer 110 blocks these partial surrounding areas 198, 199. The position and size of the blocked partial surrounding areas 198, 199 depend on the trailer angle α (see also FIG. 1B), the trailer angle α in FIG. 1A being 0°. Moreover, the surrounding area 197 underneath the trailer 110 is not captured by any current camera image. In other words, the partial surrounding area 197 underneath the trailer 110 is not recorded at the present point in time. Furthermore, at the present point in time in FIG. 1A, the partial surrounding area 196 underneath the vehicle 100 is not recorded. In order to be able to represent these partial surrounding areas that are not recorded at the present point in time in the environment model, items of image information of vehicle cameras 121, 122, 123, 124 and of trailer camera 125 in a close range around vehicle 100 are stored while the vehicle is traveling. The computing device 130 of the vehicle, which is advantageously connected to vehicle cameras 121, 122, 123, 124 and to the trailer camera 125, is designed to generate or compute an environment model, based on the current camera images of vehicle cameras 121, 122, 123, 124 and on the current camera image of trailer camera 125 and additionally based on stored items of image information from the past, which represent the partial surrounding areas 196 to 199, and to generate an output signal for a display device 131 for displaying the environment model, the currently not recorded partial surrounding areas 196 to 199 being advantageously visually represented by the stored items of image information.

Figure 1B:
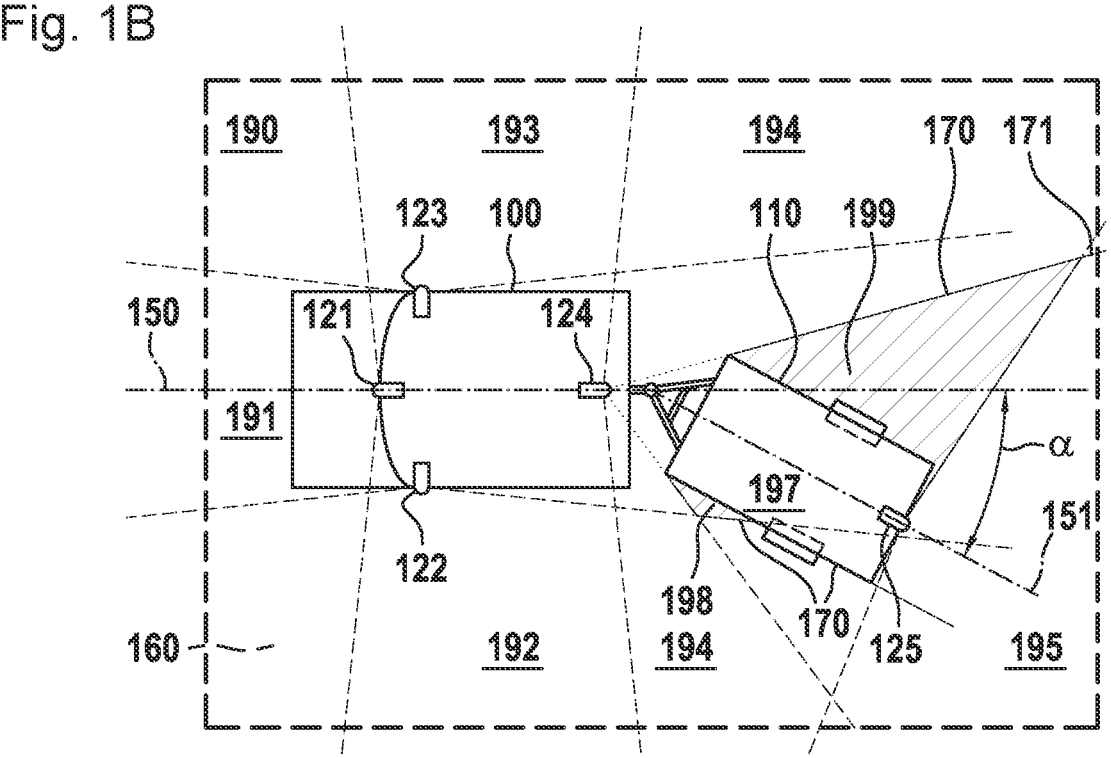
FIG. 1B shows a vehicle with trailer having a different trailer angle α.

FIG. 1B schematically shows vehicle 100 with trailer 110 with a different trailer angle α compared to FIG. 1A. This illustrates a change in the position and size of the non-recorded partial surrounding areas 198 and 199 as a function of the trailer angle α and a change in the position of the detection range 195 of trailer camera 125. For the environment model, these changes result in shifted and changed joint lines 170 between the stored items of image information regarding the partial surrounding areas 197, 198 and 199 and the adjacent current vehicle camera images of vehicle cameras 121, 122, 123, 124 and of the current trailer camera image of trailer camera 125 that are projected in the environment model. In other words, for representing the partial surrounding areas 197 to 199 using the stored items of image information, the position of the first masking with joint lines 170 must be continuously adjusted as a function of the trailer angle α. The position of a second masking with joint lines 171 for projecting the trailer camera image for representing the rearward surrounding area 195 is also continuously adjusted in the displayed environment model based on trailer angle α. FIG. 1B additionally shows in schematic fashion an example of a close range 160 of vehicle 100. The size of the close range 160 may be predetermined or may vary. The size of the close range 160 may be adjusted preferably as a function of the ascertained dimensions of the trailer 110 or as a function of a detected user input regarding the dimensions of trailer 110. Additionally or alternatively, the adjustment of the size of the close range 160 may occur as a function of the odometry data and/or of the trailer angle α and/or of an ascertained predicted movement trajectory of trailer 110. Items of image information are stored regarding the close range 160. The frequency for storing the items of image information based on the current vehicle camera images and the current trailer camera image is in particular predetermined or variable. The frequency for storing the items of image information is preferably a function of the detected odometry data of the vehicle, in particular a function of the vehicle speed. In other words, current vehicle camera images and/or current trailer camera images regarding the close range 160 are stored as items of image information in an electronic memory of vehicle 100, in particular of the computing device 130, in particular with a variable frequency depending on the vehicle speed, the vehicle camera images and the trailer camera images being advantageously stored in preprocessed fashion. The position of the stored items of image information is continuously adjusted based on the detected odometry data of vehicle 100, in particular based on the speed and a yaw angle or steering angle of the vehicle 100 or based on the movement trajectory of vehicle 100. When vehicle 100 moves with trailer 110, there thus advantageously exist stored items of image information for the entire close range 160, which are projected or inserted into the environment model as a function of the positions of the partial surrounding areas 197 to 199 or the positions of the first and second masking.

FIG. 2 schematically shows a method sequence as a block diagram. First, a series of vehicle camera images is recorded 210 using each of the at least three vehicle cameras 121, 122, 123, 124, the vehicle camera images respectively representing the partial area 191, 192, 193 or 194 of the environment 190. In a further method step, a series of trailer camera images is recorded 220 using the trailer camera 125, which represents the environment of vehicle 100 behind the trailer 110 or the partial area 195 of the environment 190. Preferably, in a further optional method step 225, static or dynamic objects are detected on the basis of the recorded vehicle camera images and/or of the recorded trailer camera image and/or recorded sensor data of another distance detection device, the other distance detection device comprising for example at least one ultrasonic sensor, a radar sensor and/or a lidar sensor. In another method step, the acquisition 230 of odometry data of the vehicle is performed. In an optional step 231, the steering angle of the vehicle is detected. Subsequently, the trailer angle α between the longitudinal axis 151 of the trailer 110 and the longitudinal axis 150 of vehicle 100 is ascertained in step 240. In an optional step 241, it may be provided that a predicted movement trajectory of the trailer 110 is ascertained at least as a function of the ascertained trailer angle α and as a function of the detected steering angle. The predicted movement trajectory of the trailer 110 is ascertained in particular on the basis of detected or ascertained dimensions of trailer 110 and/or a detected speed of vehicle 100. Furthermore, a preprocessing 250 of the recorded current vehicle images and of the recorded current trailer camera image is performed. In the preprocessing 250, the images are advantageously deskewed and/or the resolution of the images is adjusted and/or the brightness and/or the colors and/or the contrast between the images are adjusted in the preprocessing. Moreover, in the preprocessing 250, the observational perspective onto the respective image is advantageously changed, a view vertically from above being ascertained in particular. In an optional step 260, an adjustment of the size of the close range 160 of vehicle 100 may be provided for storing the image information. The adjustment 260 of the size of the close range 160 advantageously occurs as a function of the ascertained dimensions of the trailer or as a function of a detected user input regarding the dimensions of the trailer 110 and/or as a function of the detected odometry data and/or as a function of the ascertained trailer angle α and/or as a function of the ascertained predicted movement trajectory of the trailer 110. Subsequently, in step 270, items of image information about the close range 160 of the vehicle 100 are stored as a function of the preprocessed vehicle camera images and/or of the preprocessed trailer camera image, a position relative to the vehicle 100 being assigned to the stored items of image information. In a step 275, the position of the stored items of image information is adjusted as a function of the detected odometry data of the vehicle. Subsequently, an environment model is generated or ascertained from a virtual observational perspective and is displayed in step 290. The display 290 of the environment model advantageously occurs from a virtual observational perspective vertically from top to bottom. Alternatively, the display 290 of the environment model may occur from a virtual observational perspective, which is preferably within or above the trailer and is essentially oriented in the rearward environment of the trailer. The display 290 of the environment model preferably comprises at least one schematic border of the trailer, which represents the dimensions of trailer 110, the schematic border representing the trailer being automatically ascertained on the basis of the at least three vehicle camera images. The representation of trailer 110 furthermore occurs in particular partially or advantageously entirely in a transparent manner. In the display 290 of the environment model, the preprocessed current vehicle camera images and the preprocessed current trailer camera image are projected onto a projection area of the environment model and joined together, the stored items of image information regarding the partial areas 196 and/or 197 to 199 of the environment that are not represented in the current vehicle camera images or in the current trailer camera image being projected onto the projection area according to their position relative to the vehicle or according to the position of the first and second masking and these projected items of image information being joined together with the projected preprocessed current vehicle camera images and the projected preprocessed current trailer camera image. The first masking for projecting the stored items of information about the partial surrounding areas 198 and 199 and/or the second masking for projecting the trailer camera image onto the projection area with respect to partial area 195 of the environment are advantageously continuously adjusted in step 280 based on the ascertained trailer angle. Thus, in step 290, there may be an optional provision for the ascertained predicted movement trajectory of the trailer 110 to be inserted into the displayed environment model. Preferably, in step 290, the detected object is highlighted in the displayed environment model and/or a collision warning is displayed 290 in the environment model for a user of the vehicle if the detected object is located in the ascertained predicted movement trajectory of the trailer and/or if the detected dynamic object is moving into the ascertained predicted movement trajectory of the trailer. Alternatively or additionally, information is inserted in the display 290 of the environment model about the distance between the detected object and the trailer 110 and/or between the detected object and one of the wheels of the trailer 110 as trailer 110 moves along the ascertained predicted movement trajectory. The inserted distance information represents in particular a distance perpendicular to the ascertained predicted movement trajectory of trailer 110. In an optional step 285 prior to displaying the environment model, an input of a user regarding a parking space for the trailer 110 is detected and/or an (automatic) detection of the parking space for trailer 110 is performed on the basis of the detected vehicle camera images and/or the detected trailer camera image. Subsequently, in step 290, a coloring of the inserted movement trajectory of the trailer is optionally adjusted, as the movement trajectory guides the trailer to the input or detected parking space. Alternatively or additionally, in step 290, the required steering movement direction and/or the required steering angle for the automatic or assisted guidance of the trailer 110 to the input or detected parking space may be inserted in the display of the environment model and/or this required steering movement direction and/or this required steering angle may be set in step 295. The method is preferably carried out continuously.

What is claimed is:

1. A method for representing an environment of a vehicle having a coupled trailer, the vehicle including at least three vehicle cameras, which are situated respectively on different sides of the vehicle, and the trailer having at least one trailer camera situated on a rear side of the trailer, the method comprising the following steps:
   recording a sequence of vehicle camera images using each of the at least three vehicle cameras, the vehicle camera images respectively representing a partial area of the environment;
   recording a sequence of trailer camera images using the trailer camera, which represent a rearward environment behind the trailer;
   acquiring odometry data of the vehicle;
   ascertaining a trailer angle between a longitudinal axis of the trailer and a longitudinal axis of vehicle;
   preprocessing the recorded current vehicle camera images and the recorded current trailer camera image;
   storing items of image information about a close range of the vehicle as a function of the preprocessed vehicle camera images and/or of the preprocessed trailer camera image, a position relative to the vehicle being assigned to the stored items of image information;
   adjusting the position of the stored items of image information as a function of the detected odometry data of the vehicle; and
   displaying an environment model from a virtual observational perspective, the preprocessed current vehicle camera images and the preprocessed current trailer camera image being projected onto a projection area of the environment model and being joined, and for partial areas of the environment of the vehicle that are not represented in the current vehicle camera images or in the current trailer camera image, the stored items of information being projected onto the projection area according to their position relative to the vehicle and being joined to the vehicle camera images and the trailer camera image.

2. The method as recited in claim 1, wherein a first masking for projecting the stored items of image information about the partial surrounding areas that are currently not detected and/or a second masking for projecting the trailer camera image of the currently detected partial surrounding area of the trailer camera are continuously adjusted on the projection area based on the ascertained trailer angle.

3. The method as recited in claim 1, further comprising:
   acquiring a steering angle of the vehicle; and
   ascertaining a predicted movement trajectory of the trailer at least as a function of the ascertained trailer angle and as a function of the detected steering angle;
   wherein the display occurs with an insertion of the ascertained predicted movement trajectory of the trailer into the environment model.

4. The method as recited in claim 3, further comprising:
   detecting a static or dynamic object based on the recorded vehicle camera images and/or on the recorded trailer camera image and/or on sensor data of another distance detection device; and
   displaying the environment model,
      i. the detected object being highlighted; and/or
      ii. a collision warning being displayed for a user of the vehicle when the detected object is located in the ascertained predicted movement trajectory of the trailer and/or when the detected dynamic object is moving into the ascertained predicted movement trajectory of the trailer; and/or
      iii. information being inserted about a distance between the detected object and the trailer or between the detected object and one of the wheels of the trailer as the trailer moves along the ascertained predicted movement trajectory.

5. The method as recited in claim 4, further comprising:
   detecting an input of a user regarding a parking space for the trailer and/or detecting the parking space for the trailer based on the detected vehicle camera images and/or the detected trailer camera image; and
   wherein in the display of the environment model,
      i. a coloring of the inserted movement trajectory of the trailer is adjusted, as the movement trajectory guides the trailer to the input or detected parking space, and/or
      ii. the required steering movement direction and/or the required steering angle for the automatic or assisted guidance of the trailer to the input or detected parking space is inserted.

6. The method as recited in claim 1, wherein the display of the environment model occurs from a virtual observational perspective vertically from top to bottom.

7. The method as recited in claim 1, wherein the display of the environment model occurs from a virtual observational perspective, which is within or above the trailer and which is directed into the rearward environment of the trailer.

8. The method as recited in claim 1, wherein the display of the environment model includes at least a schematic border of the trailer, which represents dimensions of trailer, the schematic border representing the trailer being automatically ascertained based on the vehicle camera images from the at least three vehicle cameras.

9. The method as recited in claim 8, further comprising:
adjusting a size of the close range as a function of the ascertained dimensions of the trailer or as a function of a detected user input regarding the dimensions of the trailer and/or as a function of the acquired odometry data and/or as a function of the ascertained trailer angle and/or as a function of the ascertained predicted movement trajectory of the trailer.

10. A non-transitory computer-readable medium on which is stored a computer program including commands for representing an environment of a vehicle having a coupled trailer, the vehicle including at least three vehicle cameras, which are situated respectively on different sides of the vehicle, and the trailer having at least one trailer camera situated on a rear side of the trailer, the commands, when executed by a computer, causing the computer to perform the following steps:
recording a sequence of vehicle camera images using each of the at least three vehicle cameras, the vehicle camera images respectively representing a partial area of the environment;
recording a sequence of trailer camera images using the trailer camera, which represent a rearward environment behind the trailer;
acquiring odometry data of the vehicle;
ascertaining a trailer angle between a longitudinal axis of the trailer and a longitudinal axis of vehicle;
preprocessing the recorded current vehicle camera images and the recorded current trailer camera image;
storing items of image information about a close range of the vehicle as a function of the preprocessed vehicle camera images and/or of the preprocessed trailer camera image, a position relative to the vehicle being assigned to the stored items of image information;
adjusting the position of the stored items of image information as a function of the detected odometry data of the vehicle; and
displaying an environment model from a virtual observational perspective, the preprocessed current vehicle camera images and the preprocessed current trailer camera image being projected onto a projection area of the environment model and being joined, and for partial areas of the environment of the vehicle that are not represented in the current vehicle camera images or in the current trailer camera image, the stored items of information being projected onto the projection area according to their position relative to the vehicle and being joined to the vehicle camera images and the trailer camera image.

11. A computing device for a vehicle including a central processing unit or zonal processing unit or control unit, having a coupled trailer, the vehicle including at least three vehicle cameras, which are situated respectively on different sides of the vehicle, and the trailer having at least one trailer camera situated on a rear side of the trailer, the computing device comprising:
a first signal input, which is configured to provide a first signal, which represents recorded vehicle camera images of a vehicle camera;
a second signal input, which is configured to provide a second signal, which represents recorded vehicle camera images of a trailer camera;
a processor of the computing device, configured to:
record a sequence of vehicle camera images using each of the at least three vehicle cameras, the vehicle camera images respectively representing a partial area of an environment;
record a sequence of trailer camera images using the trailer camera, which represent a rearward environment behind the trailer;
acquire odometry data of the vehicle;
ascertain a trailer angle between a longitudinal axis of the trailer and a longitudinal axis of vehicle;
preprocess the recorded current vehicle camera images and the recorded current trailer camera image;
store items of image information about a close range of the vehicle as a function of the preprocessed vehicle camera images and/or of the preprocessed trailer camera image, a position relative to the vehicle being assigned to the stored items of image information;
adjust the position of the stored items of image information as a function of the detected odometry data of the vehicle; and
display an environment model from a virtual observational perspective, the preprocessed current vehicle camera images and the preprocessed current trailer camera image being projected onto a projection area of the environment model and being joined, and for partial areas of the environment of the vehicle that are not represented in the current vehicle camera images or in the current trailer camera image, the stored items of information being projected onto the projection area according to their position relative to the vehicle and being joined to the vehicle camera images and the trailer camera image, wherein the processor is configured to produce an output signal for a display device for the displaying of the environment model.

12. A vehicle, comprising:
a computing device for the vehicle including a central processing unit or zonal processing unit or control unit, the vehicle having a coupled trailer and including at least three vehicle cameras, which are situated respectively on different sides of the vehicle, and the trailer having at least one trailer camera situated on a rear side of the trailer, the computing device comprising:
a first signal input, which is configured to provide a first signal, which represents recorded vehicle camera images of a vehicle camera;
a second signal input, which is configured to provide a second signal, which represents recorded vehicle camera images of a trailer camera;
a processor of the computing device, configured to:
record a sequence of vehicle camera images using each of the at least three vehicle cameras, the vehicle camera images respectively representing a partial area of an environment;
record a sequence of trailer camera images using the trailer camera, which represent a rearward environment behind the trailer;
acquire odometry data of the vehicle;
ascertain a trailer angle between a longitudinal axis of the trailer and a longitudinal axis of vehicle;
preprocess the recorded current vehicle camera images and the recorded current trailer camera image;
store items of image information about a close range of the vehicle as a function of the preprocessed vehicle camera images and/or of the preprocessed trailer camera image, a position relative to the vehicle being assigned to the stored items of image information;

adjust the position of the stored items of image information as a function of the detected odometry data of the vehicle; and display an environment model from a virtual observational perspective, the preprocessed current vehicle camera images and the preprocessed current trailer camera image being projected onto a projection area of the environment model and being joined, and for partial areas of the environment of the vehicle that are not represented in the current vehicle camera images or in the current trailer camera image, the stored items of information being projected onto the projection area according to their position relative to the vehicle and being joined to the vehicle camera images and the trailer camera image, wherein the processor is configured to produce an output signal for a display device for the displaying of the environment model.

\* \* \* \* \*